United States Patent [19]

Kozar

[11] Patent Number: 4,512,901
[45] Date of Patent: Apr. 23, 1985

[54] SOLVENT ADDITION TO DEEP BED FILTER

[75] Inventor: Robert S. Kozar, Livonia, Mich.

[73] Assignee: AMSTED Industries Incorporated, Chicago, Ill.

[21] Appl. No.: 176,658

[22] Filed: Aug. 11, 1980

[51] Int. Cl.³ ............................................. B01D 23/10
[52] U.S. Cl. .................................... 210/792; 210/799; 210/189; 210/265; 210/269
[58] Field of Search ................ 210/792, 799, 804–807, 210/197, 199, 202, 257.1, 258, 259, 265, 269, 295, 299, 302, 189

[56] References Cited

U.S. PATENT DOCUMENTS

| 2,430,182 | 11/1947 | McGuire et al. | 210/777 |
| 3,550,774 | 12/1970 | Hirs et al. | 210/792 |
| 3,965,004 | 6/1976 | Garber | 210/799 |
| 3,992,291 | 11/1976 | Hirs | 210/799 |

OTHER PUBLICATIONS

John H. Perry, *Chemical Engineers' Handbook*, 4th ed. (New York: McGraw-Hill Book Co., Inc., 1963) pp. 19–58 and 19–59.

Primary Examiner—Ivars Cintins
Attorney, Agent, or Firm—Charles E. Bouton

[57] ABSTRACT

Oil-water mixtures are by-products of a number of known commercial activities such as crude oil production and power plant operation. Disposition of such mixtures in most all cases is prohibited by environmental regulation. Disposition may be effected, however, after separation of the oil from the water. This separation may be accomplished in a deepbed type filter. Where the oil in the water is unusually viscous or has a waxy, tar-like, or sticky consistency, for example, rejuvenation of the filter bed is enhanced by the addition of a small amount of a solvating liquid to the oil-water mixture before filtering.

2 Claims, 1 Drawing Figure

SOLVENT ADDITION TO DEEP BED FILTER

BACKGROUND OF THE INVENTION

1. Field of the Invention

This invention relates to filter systems wherein a foreign material is separated from an aqueous flow and more particularly to the separation of highly viscous oils and other tar-like and waxy matter from water in which the oils and matter have become mixed.

2. Prior Art

Means for separating oils from water are well known. For example, an API (American Petroleum Institute) gravity separator has been in use for many years. This separating means relies on the difference in specific gravity of the water and the oil. Oil in the water gradually separates upwardly to float on a surface of the water from where the oil may be skimmed. This type of device is ideal for reducing oil concentration to proximately 150 ppm.

To reduce the concentration of oil to proximately 1–2 ppm, a deep bed type filter containing a bed of a granular filter media has proved effective where the oil has a relatively low viscosity. The filter bed must be periodically rejuvenated to remove the oil collected therein. One preferred manner of filter bed rejuvenation is set forth in U.S. Pat. No. 3,550,774.

When the oil is highly viscous or has a waxy, tar-like, or gluey consistency, the use of the deep bed type filter has heretofore been impractical. Even with the improved means of filter bed rejuvenation as disclosed in the patent cited above, rejuvenation of the filter bed could not be affected.

SUMMARY OF THE INVENTION

An oil-water mixture wherein the oil is highly viscous or has a waxy, tar-like, or asphaltic consistency so as to be highly adhesive and is present in the mixture in a concentration of proximately 100–150 ppm is pumped into a deep-bed type filter. Before entering the filter a liquid solvate comprising a hydrocarbon based solvent mixed with an emulsifying agent is added to the oil-water mixture.

The emulsifying agent helps to disperse the solvent within the oil-water mixture. Because of the oleophilic nature of the solvent, it is attached to the likewise dispersed droplets of oil in the oil-water mixture. The solvent interacts with the oil droplets to reduce their adhesive surface characteristics.

As the oil-water mixture flows through the filter bed, the interacted oil droplets become trapped in the interstices formed within the filter bed. A discharge from the filter is water substantially free of oil.

Upon the filter bed having entrapped a sufficient quantity of oil to cause an increase in inflow back pressure due to the restricted flow through the bed, all flow to the filter is stopped. By selective regulation of a series of valves and activation of a scrubber pump, the oil-water mixture in the filter, the filter media and entrapped oil are formed into a slurry which circulates in a closed-loop path. This path includes a cleaning receptacle. After circulation of the slurry for a selective time period, the oil-water portion of the slurry is drawn through the receptacle leaving the filter media in a cleaned condition. The media is then returned to the filter and may receive a further batch of the oil-water mixture.

The filter bed may also be rejuvenated by backwashing in situ wherein a backwash liquid flows gently through the bed in a reverse direction. The reverse flow expands the bed to aid in a release of the entrapped oil.

The filter system of this invention has several advantages, over similar systems heretofore available.

First and of most significant importance is that a deep bed type filter may now be used to separate heavy, adhesive, viscous oils from oil-water mixtures. The water may be disposed of in an economical manner such as in a sanitary sewer or reused in a further process. The oil separated may be concentrated and further processed accordingly. Thus, a waste liquid which could not be disposed of in an environmentally acceptable manner is transformed into a form for ready disposition.

A further advantage of the system is its relative simplicity. Initial investment costs as well as operating costs are thus held to a minimum.

DESCRIPTION OF THE PREFERRED EMBODIMENT

Figure 1:
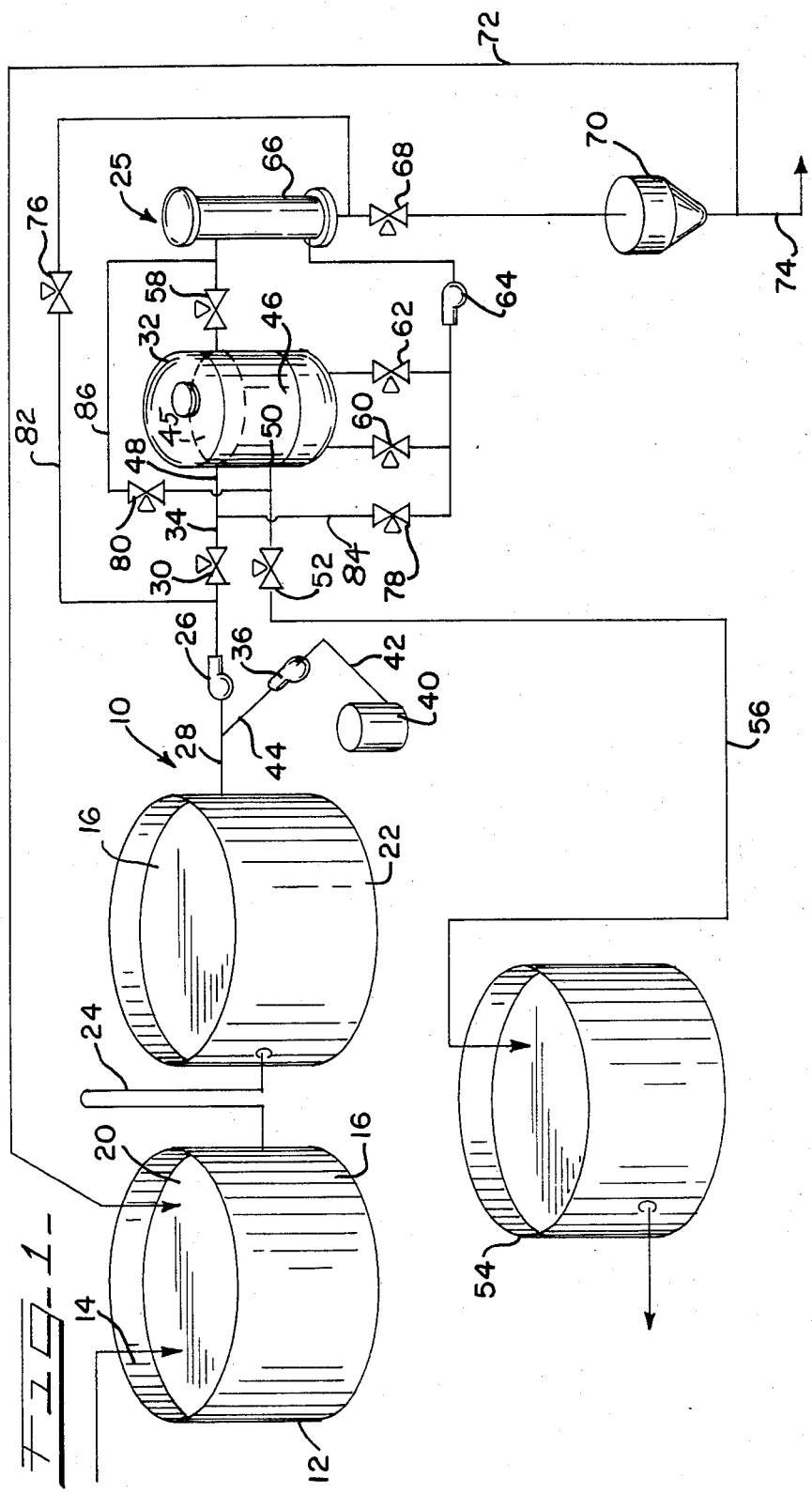
FIG. 1 is a schematic diagram of a filter system incorporating this invention.

The filter system of this invention is shown generally in FIG. 1 and designated 10. A substantially similar system to the system 10 is presently in operation in conjunction with producing oil wells in the state of Wyoming. The crude oil obtained from the wells is asphaltic in nature and as such is highly viscous and sticky. To aid in production of this crude oil, water and steam may be injected within the rock strata holding the crude oil to increase the pressure within the strata and promote the flow of the crude oil.

The injected water or steam as well as water naturally within the strata becomes mixed with the crude oil as it is pumped from the wells. As is well known, newer wells produce little water and substantially all crude oil. As the age of a well increases, the amount of water in the crude oil increases to a point where there is little crude oil and substantially all water. This water is commonly referred to as "produced" water.

Initial crude oil-water separation may be accomplished in a gravity separating tank 12 with the crude oil-water mixture entering through an inlet pipe 14. Because the oil has a lesser specific gravity than water, over time the water settles to a lower portion of the gravity separating tank 12 to form a water phase 16. The oil in turn floats upwardly to an upper portion of the tank 12 to form a layer of oil 20. This layer 20 may be skimmed from the water phase 16 below. After gravity separation and skimming, the concentration of oil in the water phase 16 is reduced to proximately 100–150 ppm. After this gross separation, the water phase 16 remaining in the separating tank 12 flows to a holding tank 22 through a connecting line 24.

Further processing of the water phase 16 by the system 10 is done in a polishing portion 25 in a batch manner. The polishing portion 25 has two modes of operation, an operative mode and a rejuvenation mode.

In the operative mode an input pump 26 is energized to draw the water phase 16 from the holding tank 22 through a pump inlet line 28. The water phase 16 then flows through a first valve 30 and into a filter tank 32 through a pump outlet line 34.

Concurrent with the energizing of the input pump 26, a metering pump 36 connected to a solvate storage tank 40 through a metering pump inlet line 42 is also energized. The tank 40 contains a solvate mixture comprising an aromatic hydrocarbon base solvent and an emulsifier. The solvent may be toluene, xylene or benzene, for example. Typical emulsifying agents are polyoxyethylene fatty ester, fatty acid alkanolamide, and polyethylene glycol oleic acid ester. The ratio of solvent to emulsifier may be as high as 20 to 1 and as low as 10 to 1. One ready-to-use, commercially available solvent-emulsifier mixture is made by Nalco Chemical Company of Oak Brook, Ill., and identified as Nalclean 8960.

The metering pump 36 adds a selective quantity of the solvate to the pump inlet line 28 through a metering pump outlet pipe 44. The amount of solvate added is controlled to proximately equal the amount of oil in the water phase 16. For example, if the concentration of oil proximates 125 ppm, an equal amount of solvate is added to the water phase 16 being pumped by the inlet pump 26.

Because the hydrocarbon base solvent and water are inherently nonmiscible liquids, the emulsifier in the solvate promotes an intimate dispersion of the solvent within the water phase 16. Because the solvent and oil are both oleophilic, the solvent interacts with the droplets of oil in the water phase 16 to soften and decrease the viscosity of the oil droplets. This interaction may in some cases be limited to the mere surface of the oil droplets to reduce the adhesive quality of such.

The filter tank 32 contains a deep bed 45 of granular filter media 46. Examples of materials usable as filter media are sand, coal, garnets, ground walnut shells and mixtures thereof. As the water phase 16 flows through an upper inlet 48 in the filter tank 32 and then downward through the deep bed 45 of filter media 46, the droplets of oil are entrapped within interstices formed by the filter media granular 46. The water phase 16 is discharged through a lower outlet 50 with the concentration of oil reduced to 1-2 ppm. The water phase 16 now substantially free of oil flows through a second valve 52 and into a clean water storage tank 54 through a filter tank discharge line 56. The clean water in the tank 54 can be used for reinjection in oil bearing strata below, for example.

As the amount of oil separated and held by the filter bed 45 increases, the amount of pressure required to flow the water phase 16 through the bed 45 increases to a point that effective filtration ceases. At this point the polishing portion 25 of the system 10 is changed from its operative mode to its rejuvenation mode.

First, the input pump 26 and the metering pump 36 are de-energized, and the first and second valves 30, 52 are closed. Next, third, fourth and fifth valves 58, 60 and 62 are opened, and a scrubber pump 64 energized. The scrubber pump 64 forms the water phase 16, accumulated oil and filter media 46 in the filter tank 32 into a slurry which is circulated in a closed loop. This loop also includes a cleaning receptacle 66. Proximately 15 minutes of such circulation washes the oil from the filter media 46 whereupon a sixth valve 68 is opened to allow the oil and water in the slurry to drain through a wedge wire device (not shown) within the cleaning receptacle 66. The wedge wire device allows the oil and water to flow therethrough while inhibiting passage of the filter media 46. Concurrently with the opening of the sixth valve 68, the first valve 30 is opened to allow an inflow of the water phase 16 from the holding tank 22 to replace the slurry and oil-water liquid drained through the receptacle 66.

When valves 30, 68 are open, only a small amount of the water phase 16 is added, i.e. proximately twice the volume of the filter tank 32, to the polishing portion 25 of the system 10. The slurry oil-water liquid drained through the cleaning receptacle 66 is collected in a secondary or backwash gravity separator 70. An oil portion of this slurry liquid separates upwardly from a water portion under the influence of gravity and may be removed by skimming or decanting. The water portion of the slurry, which may contain as much as several thousand ppm of oil, is returned from the backwash separator 70 to the gravity separator tank 12 for further processing through a return line 72. Any solid particulate in the separator 70 may be removed through a drain line 74.

To return the polishing portion 25 of the system 10 to its operative mode, first the third, fourth, fifth and sixth valves 58, 60, 62 and 68 are closed and seventh, eighth and ninth valves 76, 78 and 80 are opened. The scrubber pump 64 remains energized so that the granular filter media 46 is returned through a filter media return line 84 and reaccumulated in the filter tank 32 to reform the filter bed 45. During this reforming of the bed 45, the water portion of the slurry remains in circulation in part through slurry water return line 86. The reformed filter bed 45 entraps the oil in the water portion so that within minutes the scrubber pump 64 is pumping clean water. With this complete, the seventh, eighth and ninth valves 76, 78 and 80 are closed and the scrubber pump 64 de-energized. The polishing portion 25 thus may be returned to its operative mode by opening the first and second valves 30, 52 and energizing pumps 26, 38.

It should be pointed out that filter bed rejuvenation may also be accomplished by backwashing with clean water, compressed air, gas, cleaning chemicals and combinations thereof. The method of rejuvenation, i.e. with a scrubber pump or in situ, also is in some degree controlled by the type of filter media used. Some media, for example sand, does not have the physical characteristics necessary to withstand the rejuvenation procedure set forth in detail above.

While various modifications may be suggested by those versed in the art, it should be understood that I wish to embody within the scope of the patent warranted hereon, all such modifications as reasonably and properly come within the scope of my contribution to the art.

What is claimed is:

1. A method of filtering droplets of heavy, viscous oil mixed with an aqueous liquid, said method comprising the steps of:

flowing a batch of said aqueous liquid-oil mixture into a filter device, adding a selective quantity of a solvate to said mixture upstream from said filter device, said quantity of said solvate being proximately equal to a quantity of said oil in said mixture and said solvate comprising a solvent portion and an emulsifying portion, dispersing said solvent portion with said emulsifying portion of said solvate within said aqueous liquid-oil mixture to cause said solvent portion to interact with said oil droplets, entrapping said interacted oil droplets in a bed of granular filter media held within said filter device to allow said aqueous liquid to flow from said filter device in a clean, substantially oil-free state, and rejuvenating said filter media periodically by flushing said interacted oil droplets from said bed upon said entrapped oil droplets inhibiting an efficient flow of said aqueous liquid through said filter media.

2. A filter system comprising, a gravity separating tank to receive a flow of a heavy, viscous oil-water mixture having a concentration of said oil in said water exceeding 200 ppm, said tank including means to remove a layer of said oil formed by gravity separation from said water to form a water phase having a concentration of said oil of proximately 100 ppm, a holding tank connected to said gravity separating tank to receive said water phase, an input pump having an intake connected to said holding tank by a pump inlet line, a metering pump having an intake connected to a solvate tank containing a solvate for interacting with said oil to reduce adhesive qualities of such and a discharge connected to said input pump inlet line, a filter tank having an upper inlet connected to a discharge of said inlet pump through a first valve, said filter tank containing a filter bed comprising a granular filter media, a clean water discharge line connected to a lower outlet in a clear water tank through a second valve, a cleaning receptacle having an inlet connected to said filter tank through a third valve, a scrubber pump having an intake connected to a first outlet of said cleaning receptacle and a discharge connected to said filter tank through a fourth and a fifth valve, a return line connecting said gravity separating tank to a slurry oil-water outlet of said cleaning receptacle through a sixth valve, a purge line connecting said discharge of said input pump to said slurry oil-water outlet of said cleaning receptacle through a seventh valve, a filter media return line connecting a discharge of said scrubber pump with said inlet of said filter tank through an eighth valve, and a slurry water return line connecting said outlet of said filter tank with said inlet of said cleaning receptacle through a ninth valve, wherein in an operative mode of said system said first and second valves being open with a remainder of said valves being closed and said input pump and said metering pump energized to pump said water phase and said solvate in said solvate tank into said filter tank with said solvate interacting with said oil and wherein said filter media entraps said oil in said water phase so that said water phase discharges from said filter tank containing proximately 1-2 ppm of said oil, and wherein in a rejuvenation mode of said system said input and metering pump being de-energized and said first and second valves closed and with said scrubber pump energized and said remaining valves selectively opened and closed to allow said interacted, entrapped oil to be separated from said filter media and said media returned to said filter tank in a rejuvenated condition.

* * * * *